US 6,670,886 B1

(12) United States Patent
Lin

(10) Patent No.: US 6,670,886 B1
(45) Date of Patent: Dec. 30, 2003

(54) TIRE PRESSURE MONITORING DEVICE AND ANTENNA THEREFOR

(75) Inventor: Sheng Hsiung Lin, Kaohsiung (TW)

(73) Assignee: Lite-On Automotive Corporation, Kaoshiung (TW)

( * ) Notice: Subject to any disclaimer, the term of this patent is extended or adjusted under 35 U.S.C. 154(b) by 0 days.

(21) Appl. No.: 10/216,801

(22) Filed: Aug. 13, 2002

(51) Int. Cl.[7] .................................................. H04Q 7/00
(52) U.S. Cl. ...................... 340/447; 340/442; 340/539.1
(58) Field of Search ................................ 340/447, 442, 340/444, 445, 448, 539.1, 10.1, 825.72

(56) References Cited

U.S. PATENT DOCUMENTS

| | | | | |
|---|---|---|---|---|
| 4,245,725 A | * | 1/1981 | Kurita et al. ................ | 188/326 |
| 4,311,984 A | * | 1/1982 | Rigazio et al. ............. | 340/445 |
| 5,583,482 A | * | 12/1996 | Chamussy et al. .......... | 340/442 |
| 6,062,072 A | * | 5/2000 | Mock et al. ................ | 73/146.5 |
| 6,194,999 B1 | * | 2/2001 | Uhl et al. .................... | 340/447 |
| 6,304,172 B1 | | 10/2001 | Katou et al. | |

* cited by examiner

Primary Examiner—Nina Tong
(74) Attorney, Agent, or Firm—Stevens, Davis, Miller & Mosher, LLP

(57) ABSTRACT

A monitoring device is used for monitoring pneumatic tires of a vehicle, and the vehicle has a plurality of tires each with a brake device being connected to a brake system of the vehicle through a brake oil tube. The monitoring device comprises a sensor module, an antenna, and a decoding module. The sensor module is attached to the tire of the vehicle for sensing a condition of the tire and transmitting a radio signal including the condition. The antenna is disposed within the brake oil tube for receiving the radio signal which is transmitted from the sensor module. The decoding module electrically connected to the antenna for processing the received radio signal.

10 Claims, 2 Drawing Sheets

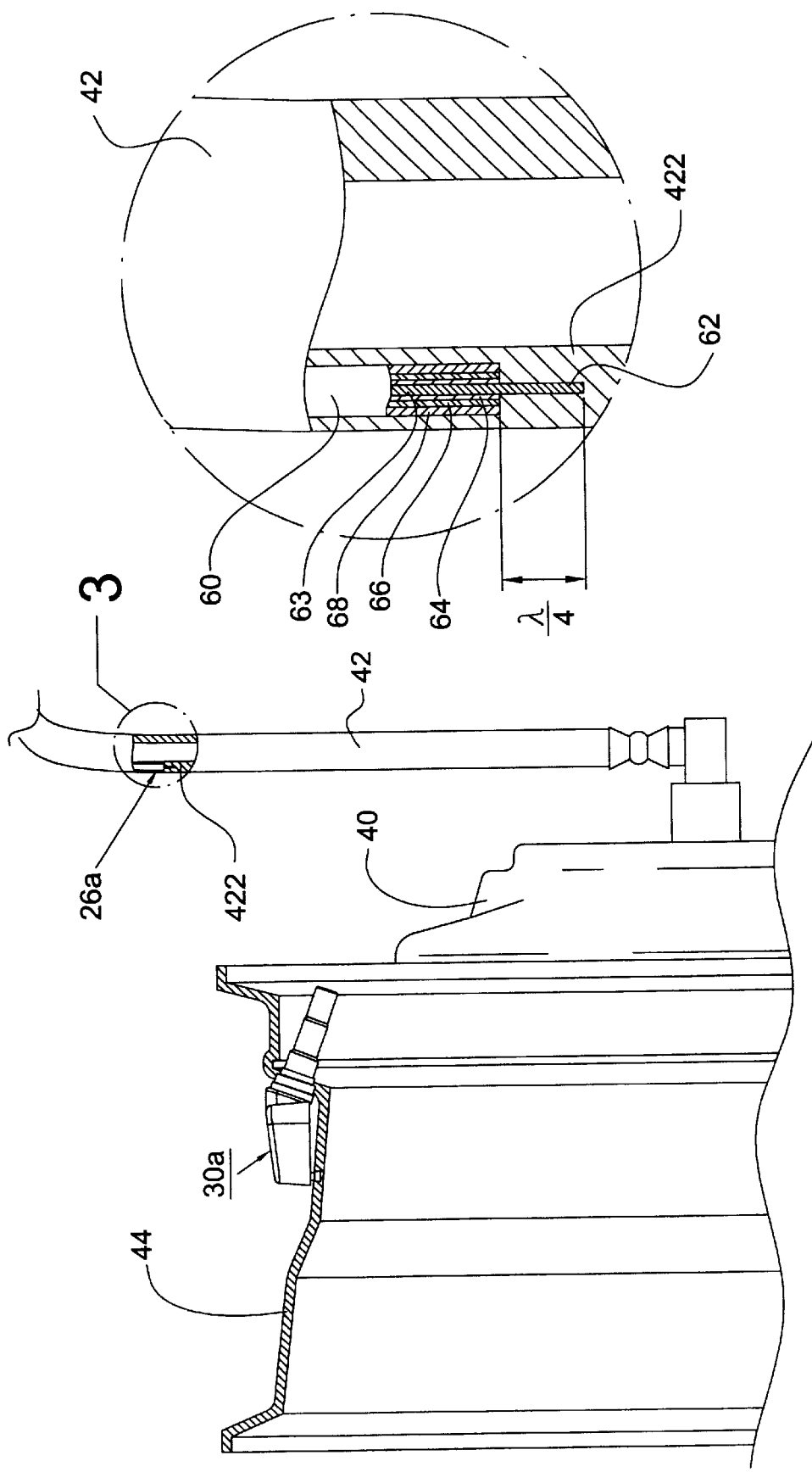

TIRE PRESSURE MONITORING DEVICE AND ANTENNA THEREFOR

BACKGROUND OF THE INVENTION

1. Field of the Invention

The present invention generally relates to a pneumatic tire monitoring device, and more particularly to a wireless pneumatic tire monitoring device which has antennas disposed within the brake oil line.

2. Description of the Related Art

Wireless tire pressure monitors have been proposed so that the tire pressures of vehicle tires can be checked in the passenger compartment. The monitor includes transmitters disposed within the wheels and a receiver attached to the body of the vehicle. Each transmitter measures the tire pressure of each corresponding tire and performs wireless transmission of the measured pressure data. The receiver receives the data from each transmitter and displays the data information of each tire on a display which is located, for example, at the dashboard in front of the driver's seat.

A typical tire pressure monitor includes four transmitters correspondingly disposed within the four tires of a vehicle. Since the output strength of radio waves or electromagnetic waves from each transmitter is limited by local communication laws and cannot be greatly increased, the receiver has four reception antennas that respectively correspond to the four transmitters to ensure reception of weak radio signals from the transmitters. Accordingly, the reception antennas are typically located in the vicinity of the tires, which have the built-in transmitters, for example, in or near the fenders (cf. Japanese Unexamined Utility Model Publication No. 2-74204).

The reception antennas described in the above Japanese Utility Model are arcuate wire antennas, which extend along the fenders. Each wire antenna induces voltage mainly by an electric field of radio waves. However, most vehicle bodies have metal fenders, which are likely to influence the electric field of radio waves. The electric field of radio waves attenuates in the vicinity of metal materials. Therefore, the wire antennas attached to the fenders cannot efficiently receive radio waves from the transmitters.

To improve the efficiency of receiving radio waves, each wire antenna must be separated from the metal surface of the corresponding fender as far as possible. However, even if the distance between a wire antenna and the metal surface is varied slightly, the performance of the wire antenna varies greatly. This makes it difficult to maintain the quality of the monitor. Also, once the wire antenna is separated from the metal surface of the corresponding fender too far, the wire antenna may interfere with the corresponding tire.

Furthermore, U.S. Pat. No. 6,304,172 B1, entitled "Receiver of Inflation Pressure Monitor" issued on Oct. 16, 2001 to Katou et al., discloses a tire pressure monitor including wheel transmitters and a receiver with magnetic field type loop antennas. The loop antennas induce voltage mainly by a magnetic field of radio waves and thus efficiently receive radio waves from the transmitters. However, the loop antenna is expensive and complicated and cannot be readily attached to the fender.

Accordingly, there exist needs for providing a tire monitoring device having an antenna which can be readily attached to the vehicle and efficiently receives the radio waves from the sensors disposed within the tires of the vehicle.

SUMMARY OF THE INVENTION

It is an object of the present invention to provide a tire monitoring device having an antenna which can be readily attached to the vehicle and efficiently receives the radio waves from the sensors disposed within the tires of the vehicle.

It is another object of the present invention to provide an antenna disposed in a vehicle for efficiently receiving the electromagnetic waves.

To achieve the aforementioned objects, the present invention provides a monitoring device for monitoring pneumatic tires of a vehicle. The vehicle has a plurality of tires each with a brake device being connected to a brake system of the vehicle through a brake oil tube. The monitoring device comprises a sensor module, an antenna, and a decoding module. The sensor module is attached to the tire of the vehicle for sensing a condition of the tire and transmitting a radio signal including the pressure and temperature condition. The antenna is disposed within the brake oil tube for receiving the radio signal which is transmitted from the sensor module. The decoding module electrically connected to the antenna for processing the received radio signal.

According to another object of the present invention, an antenna is provided for being disposed in a vehicle. The vehicle has a plurality of tires each with a brake device being connected to a brake system of the vehicle through a brake oil tube. The antenna comprises an antenna portion and a transmission line. The antenna portion is used for receiving an electromagnetic signal from an external signal source, and the transmission line electrically connected to an external circuit, wherein the antenna portion and a portion of the transmission line are attached to the brake oil tube.

BRIEF DESCRIPTION OF THE DRAWINGS

Other objects, advantages, and novel features of the invention will become more apparent from the following detailed description when taken in conjunction with the accompanying drawings:

FIG. 2 is a partial cross-sectional view of a brake oil tube.

FIG. 3 is an enlarged cross-sectional view of a brake oil tube of FIG. 2.

DETAILED DESCRIPTION OF THE PREFERRED EMBODIMENT

Figure 1:
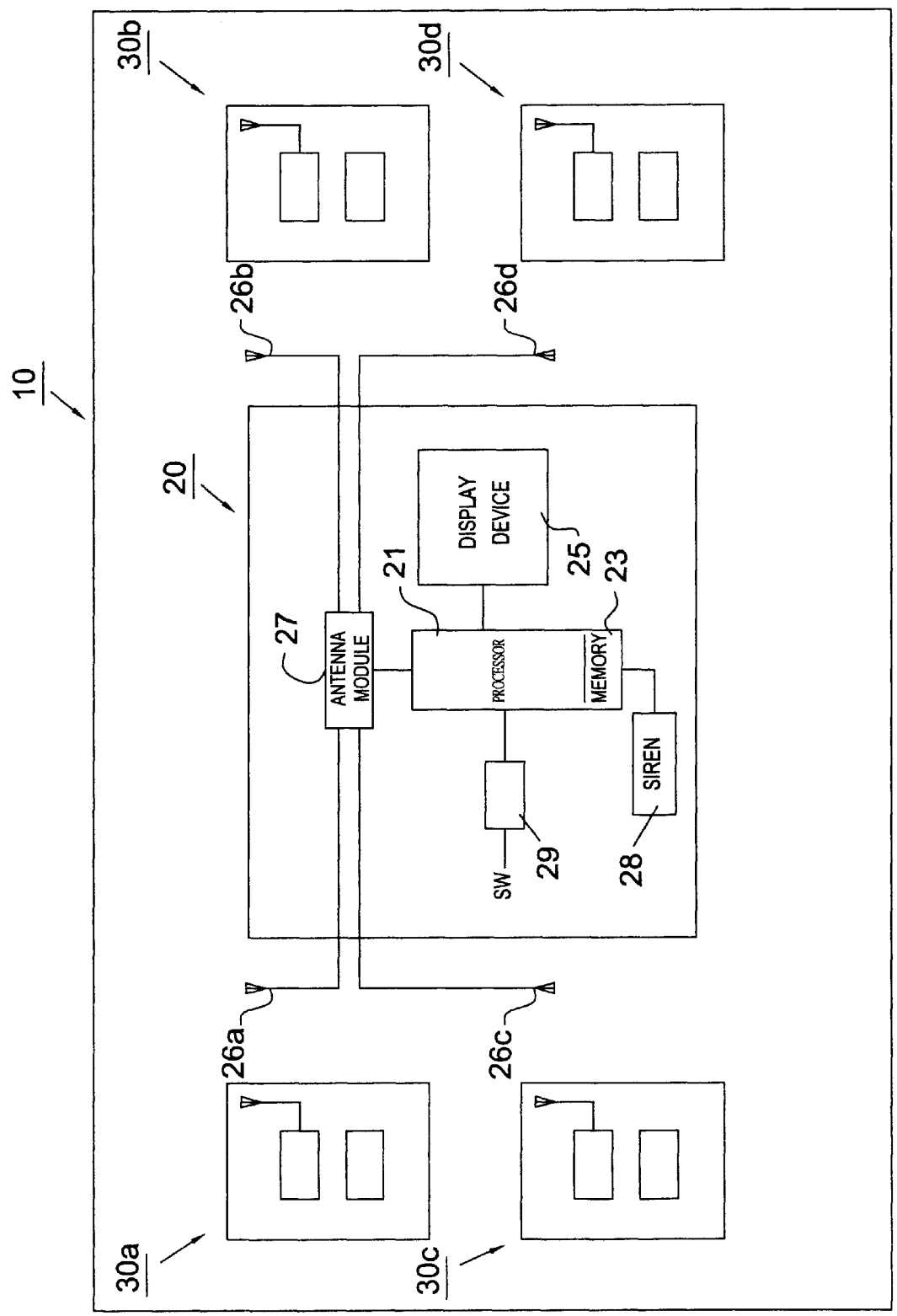
FIG. 1 is a block diagram of a monitoring device according to the embodiment of the present invention for monitoring the condition of the pneumatic tires.

The present invention will now be described more fully hereinafter with the antenna attached to a vehicle for receiving the radio signals of the tire pressure by way of an example, but it should be noted that the antenna for monitoring the tire condition according to the present invention would not be limited thereto.

Now referring to FIG. 1, it depicts a block diagram of a monitoring device 10 according to the present invention for monitoring the condition of the tires, such as pressure, temperature and the like. The monitoring device 10 comprises a decoding module 20 and a plurality of sensor modules 30a, 30b, 30c, and 30d. The decoding module 20 further comprises a processor 21, a memory 23, a display device 25, a radio frequency antenna module 27, a siren 28 and a switch interface 29.

The sensor modules 30a, 30b, 30c, and 30d are disposed respectively within the pneumatic tires of a vehicle and used to sense the tire condition. The tire condition then is encoded and is transmitted through a radio frequency signal. In an embodiment according to the present invention, the sensor modules 30a, 30b, 30c, and 30d are respectively attached to the front-left tire, the front-right tire, the rear-left tire, and the rear-right tire of the vehicle and are used to monitor the condition of each tire of the vehicle.

The radio frequency antenna module 27 is used to receive the radio frequency signal. The memory 23 is used to record the predetermined range of the normal tire condition and the monitored data of the tire condition. The processor 21 is used to decode the received radio signal and to compare the decoded data with the predetermined range stored in the memory to determine the state of the pneumatic tire. The display device 25 is used to show the state of the pneumatic tire. The siren 28 is used to sound an alarm when the state of the pneumatic tire is abnormal. The switch interface 29 is connected with an ignition switch of the vehicle such that the decoding module 20 will be actuated when the vehicle is turned on and the operation of the decoding module 20 will be controlled by the ignition switch. In an embodiment according to the present invention, the condition of the tire includes the temperature and the pressure of the tire. The similar monitoring device has been disclosed in U.S. patent application Ser. No. 09/910,725, filed on Jul. 24, 2001, and commonly assigned to the assignee of the present application. This application is expressly incorporated herein by reference in its entirety.

The radio frequency antenna module 27 further comprises four reception antennas 26a, 26b, 26c, and 26d which are disposed in correspondence to the sensor modules 30a, 30b, 30c, and 30d. That is, the reception antennas 26a, 26b, 26c, and 26d are disposed in the vicinity of the front-left tire, the front-right tire, the rear-left tire, and the rear-right tire of the vehicle, respectively. In accordance with the present invention, the reception antennas 26a, 26b, 26c, and 26d are attached to brake oil tubes 42.

Referring to FIG. 2 now, it shows a partial cross-sectional view of a brake oil tube 42 in which the reception antenna 26a of the present invention is disposed. It will be apparent to those skilled in the art that the brake oil tube 42 is typically made of rubber for delivering the brake oil or brake fluid from the master cylinder (not shown) of the brake system to the wheel brake device 40. The reception antenna 26a of the present invention comprises an antenna portion 62 and a transmission line 60 (shown in FIG. 3). A portion of the transmission line 60 and the antenna portion 62 are mounted within the rubber wall 422 of the break oil tube 42 (as shown in FIGS. 2 and 3). The reception antenna 26a is connected to the decoding module 20 through the transmission line 60. It should be noted that the reception antennas 26b, 26c and 26d are also arranged in the same manner. Although the monitoring device 10 according to the embodiment of the present invention comprises the four reception antennas 26a, 26b, 26c and 26d, a single reception antenna can also receive the radio signals transmitted by a plurality of sensor modules to monitor the conditions of all tires.

Compared with the reception antennas described in the above-mentioned Japan Utility Model Publication No. 2-74204 and U.S. Pat. No. 6,304,172 B1, which are attached to the fender, the antenna portion 62 according to the present invention is relatively close to the sensor module. Therefore, the antenna portion 62 can efficiently receive the radio signals transmitted by the sensor module 30 which is attached to a rim 44 of the tire of the vehicle (as shown in FIG. 2). Furthermore, the rubber wall 422 is made of a nonconductive material and substantially apart from the other metal material of the vehicle, so the efficiency of receiving radio signals of the reception antenna 26 is further enhanced.

Furthermore, referring to FIG. 3, it depicts the brake oil tube 42 and the reception antenna 26a according to an embodiment of the present invention. The transmission line 60 can be a well-known coaxial cable including a core conductor 63, an insulation 64, a braid shield conductor 66, and a jacket 68. The antenna portion 62 is formed in such a manner that the insulation 64, the braid shield conductor 66 and the jacket 68 are cut or peeled to expose the core conductor 63 that serves as the antenna portion 62. The exposed length of the core conductor 63 or the length of the antenna portion 62 is approximately $n*¼$ or $¼$ wavelength of the electromagnetic wave of the central frequency of the radio signals. In an embodiment of the present invention, if the central frequency of the radio signals is about 433.92 MHz, the length of the antenna portion 62 is approximately 17 cm so as to obtain a desired antenna gain.

In addition, those skilled in the art will appreciate that the antenna according to the present invention can be used for receiving other radio signals, such as those of the vehicle security. The length of the antenna portion can be varied according to the frequency of the signals, i.e. the length should be equal to $¼$ wavelength of the signals.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure arrangement, proportions, materials, elements, and components and otherwise, used in the practice of the invention, which are particularly adapted to specific environments and operating requirements without departing from the principles of the present invention. The presently disclosed embodiments are therefore to be considered in all respects as illustrative and not restrictive, the scope of the invention being indicated by the appended claims and their legal equivalents, and not limited to be the foregoing description.

What is claimed is:

1. A monitoring device for monitoring pneumatic tires of a vehicle, the vehicle having a plurality of tires each with a brake device being connected to a brake system of the vehicle through a brake oil tube, and the monitoring device comprising:

at least one sensor module attached to the tire of the vehicle for sensing a condition of the tire and transmitting a radio signal including the condition;

at least one antenna disposed within the brake oil tube for receiving the radio signal which is transmitted from the sensor module; and a decoding module electrically connected to the antenna for processing the received radio signal.

2. The monitoring device as claimed in claim 1, wherein the brake oil tube has a rubber layer, and the antenna is mounted within the rubber wall of the brake oil tube.

3. The monitoring device as claimed in claim 1, wherein the antenna is electrically connected to the decoding module through a coaxial cable.

4. The monitoring device as claimed in claim 3, wherein the coaxial cable has a core conductor and the antenna is a portion of the core conductor extending from the coaxial cable.

5. The monitoring device as claimed in claim 4, wherein the length of the antenna is about ¼ wavelength of the electromagnetic wave of the radio signal.

6. The monitoring device as claimed in claim 4, wherein the central frequency is about 433.92 MHz, and the length is about 17 cm.

7. An antenna disposed in a vehicle, the vehicle having a plurality of tires each with a brake device being connected to a brake system of the vehicle through a brake oil tube, and the antenna comprising:

an antenna portion for receiving a electromagnetic signal from an external signal source; and a transmission line electrically connected to an external circuit, wherein the antenna and a portion of the transmission line are disposed within the brake oil tube.

8. The antenna as claimed in claim 7, wherein the brake oil tube has a rubber layer, and the antenna is mounted within the rubber wall of the brake oil tube.

9. The antenna as claimed in claim 7, wherein the transmission line is a coaxial cable.

10. The antenna as claimed in claim 9, wherein the coaxial cable has a core conductor and the antenna is a portion of the core conductor extending from the coaxial cable.

* * * * *